United States Patent
Jakab et al.

(10) Patent No.: US 12,320,303 B2
(45) Date of Patent: Jun. 3, 2025

(54) COMBINED CONTROL VALVE AND AIR TURBINE STARTER

(71) Applicant: Hamilton Sundstrand Corporation, Charlotte, NC (US)

(72) Inventors: Thomas K. Jakab, Lake Geneva, WI (US); Benjamin T. Harder, Sycamore, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/189,384

(22) Filed: Mar. 24, 2023

(65) Prior Publication Data

US 2024/0318603 A1    Sep. 26, 2024

(51) Int. Cl.
  *F02C 7/277*    (2006.01)
  *F01D 9/04*     (2006.01)
  *F01D 17/16*    (2006.01)

(52) U.S. Cl.
  CPC .............. *F02C 7/277* (2013.01); *F01D 9/041* (2013.01); *F01D 17/16* (2013.01); *F05D 2240/128* (2013.01); *F05D 2260/85* (2013.01)

(58) Field of Classification Search
  CPC .......... F02C 7/277; F01D 9/041; F01D 17/16; F05D 2240/128; F05D 2260/85
  See application file for complete search history.

(56) References Cited

U.S. PATENT DOCUMENTS

| | | | | |
|---|---|---|---|---|
| 3,266,251 A | * | 8/1966 | Kacek | F02C 7/277 60/39.47 |
| 3,481,145 A | * | 12/1969 | Oldfield | F02C 7/277 60/788 |
| 4,038,815 A | * | 8/1977 | Heitmann | F23R 3/38 60/726 |
| 4,805,873 A | * | 2/1989 | Mouton | F16K 31/003 251/30.05 |

(Continued)

FOREIGN PATENT DOCUMENTS

| | | | | |
|---|---|---|---|---|
| CN | 104533631 A | | 4/2015 | |
| CN | 108035810 A | * | 5/2018 | ............. F01D 21/00 |

OTHER PUBLICATIONS

Goa et al. CN 104533631 English Machine Translation Espacenet— Bibliographic data (Year: 2015).*

(Continued)

*Primary Examiner* — David E Sosnowski
*Assistant Examiner* — Wayne A Lambert
(74) *Attorney, Agent, or Firm* — Carlson, Gaskey & Olds, P.C.

(57) ABSTRACT

A combined air turbine starter and flow control valve includes a turbine having turbine blades and a shaft rotating with the turbine blades. The turbine is received within a nozzle housing. The nozzle housing includes an inlet. A radially outwardly extending inner surface extends from the inlet and toward the turbine blades. A flow control piston is received to be movable along a rotational axis of the turbine shaft, and toward and away the radially outwardly extending (Continued)

surface of the nozzle housing. A control is programmed to direct a movement system to position the flow control piston relative to the radially outwardly extending surface to achieve a desired volume of airflow to the turbine blades. A gas turbine engine starting system is also disclosed.

14 Claims, 2 Drawing Sheets

(56) References Cited

U.S. PATENT DOCUMENTS

| | | | |
|---|---|---|---|
| 7,419,364 B2 | 9/2008 | Ramstein et al. | |
| 10,767,564 B2 | 9/2020 | Kelly et al. | |
| 2001/0028845 A1* | 10/2001 | Langston | F01D 11/00 |
| | | | 415/122.1 |
| 2005/0058542 A1* | 3/2005 | Kruegel | F02C 7/277 |
| | | | 415/191 |
| 2005/0139019 A1* | 6/2005 | Bristol | F02C 7/277 |
| | | | 74/6 |
| 2005/0191166 A1* | 9/2005 | Farnsworth | F01D 25/183 |
| | | | 415/110 |
| 2014/0250914 A1* | 9/2014 | Slayter | F02C 7/277 |
| | | | 60/787 |
| 2019/0331030 A1* | 10/2019 | Kelly | F04D 27/023 |

OTHER PUBLICATIONS

Goa et al. CN 108035810 English Machine Translation Espacenet—Bibliographic data (Year: 2018).*
European Search Report for EP Application No. for EP Application No. 24165337.7 dated Sep. 4, 2024.

* cited by examiner

COMBINED CONTROL VALVE AND AIR TURBINE STARTER

BACKGROUND

This application relates to a starter system for a gas turbine engine wherein an airflow control valve is incorporated into a nozzle of an air turbine starter.

Gas turbine engines are utilized in aircraft applications. Various accessories are associated with aircraft gas turbine engines.

One type of accessory is an air turbine starter. An air turbine starter is selectively connected to an accessory gearbox in the gas turbine engine. A source of pressurized air is communicated into the air turbine starter, and drives a turbine which in turn drives the accessory gearbox.

As known, an accessory gearbox has a tower shaft that is connected to a spool shaft in the gas turbine engine. During normal aircraft operation the spool shaft drives the tower shaft to in turn drive the accessories associated with the accessory gearbox. However at start, the torque transfer moves in the opposite direction to begin turning the spool shaft.

Typically a control valve controls the flow of air between the source of compressed air and the air turbine starter. In the prior art this valve has been remote from the air driven starter and its housing.

SUMMARY

A combined air turbine starter and flow control valve includes a turbine having turbine blades and a shaft rotating with the turbine blades. The turbine is received within a nozzle housing. The nozzle housing includes an inlet. A radially outwardly extending inner surface extends from the inlet and toward the turbine blades. A flow control piston is received to be movable along a rotational axis of the turbine shaft, and toward and away the radially outwardly extending surface of the nozzle housing. A control is programmed to direct a movement system to position the flow control piston relative to the radially outwardly extending surface to achieve a desired volume of airflow to the turbine blades.

These and other features will be best understood from the following drawings and specification, the following is a brief description.

DETAILED DESCRIPTION

Figure 1:
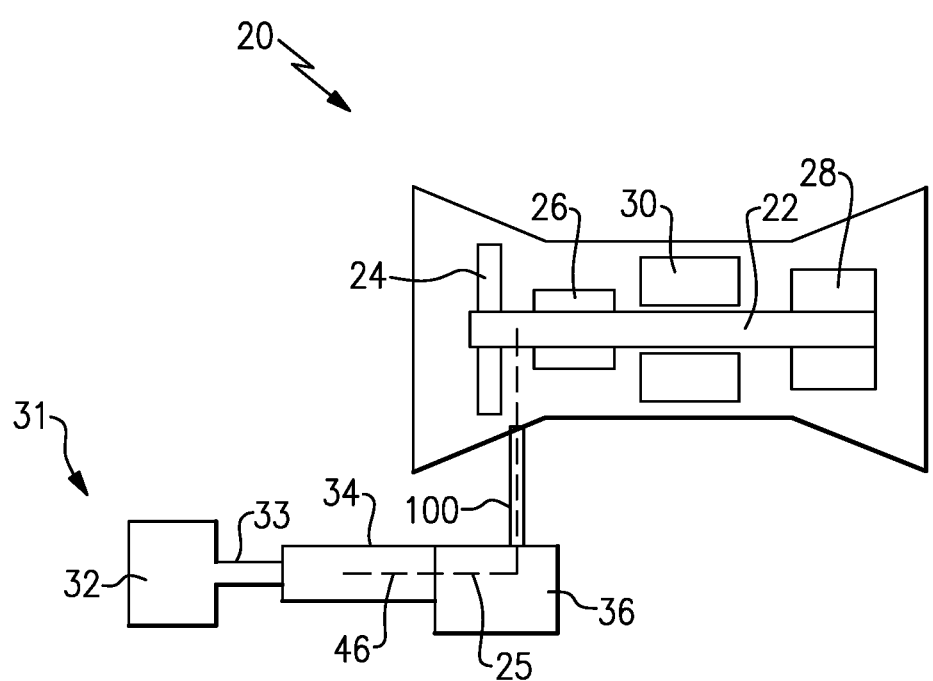
FIG. 1 schematically shows a gas turbine engine and an associated starter system.

FIG. 1 shows a gas turbine engine 20 having a spool shaft 22 rotating with a fan rotor 24, a compressor 26 and a turbine 28. A combustor 30 is positioned intermediate the compressor 26 and turbine 28. In practice, there are typically at least two spool shafts each driving compressor and turbine sections. That is, FIG. 1 shows the gas turbine engine 20 in a very schematic manner.

A starter system 31 is shown having a source of compressed air 32. The source of compressed air 32 may be an auxiliary power unit ("APU"), an air cart, or a cross bleed from a gas turbine engine which is already running. Air from the source 32 passes into a conduit 33 and to an air turbine starter 34. The air turbine starter 34 includes a shaft 46 driving a shaft 25 in the auxiliary gearbox 36 to in turn drive the tower shaft 100. The tower shaft 100 is rotatably connected with the spool shaft 22, and drives the spool shaft 22 at startup to begin rotation of the components 24, 26 and 28. The description to this point is known, other than in the prior art there has typically been an airflow control valve on the conduit 33.

Figure 2:
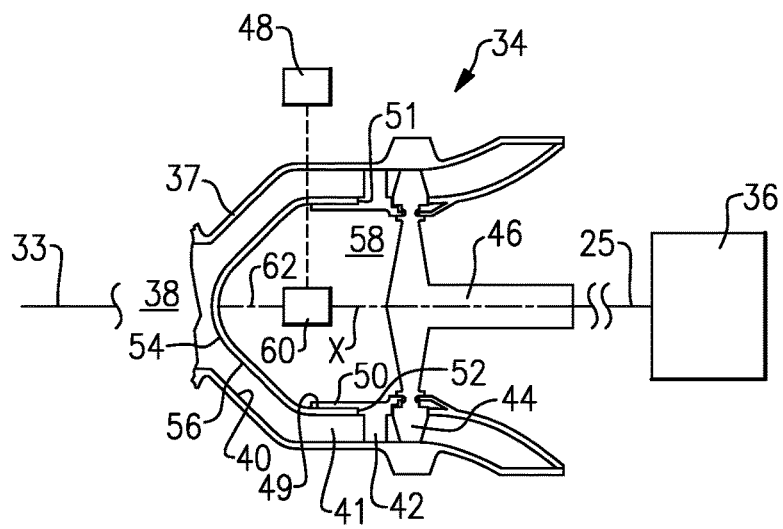
FIG. 2 shows an airflow control valve incorporated into the nozzle of an air turbine starter in an open position.

FIG. 2 shows a combination 34 of the air turbine starter and the airflow control valve. Thus, a housing 37 defines a nozzle surface 40 moving from an inlet 38 connected to the conduit 33 and leading into a radially outwardly extending nozzle surface 40. Downstream of the nozzle surface 40, the airflow reaches a generally cylindrical section 41 that is generally centered about a rotational axis X of a turbine shaft 46. The air passes over vanes 42, and then blades 44 which drive the turbine shaft 46.

Air from the source 32 thus moves through the nozzle surface 40 and drives the blades 44. A valve piston 54 is received in housing structure 50 which provides a guiding surface for the valve piston 54. As shown, housing surface 50 is connected to the vanes 42, although this is not necessary.

A stop 51 is shown abutting a rear end 52 of the piston 54. A generally conical outer surface 56 defines the flowpath in combination with the nozzle surface 40. Shaft 46 is shown schematically driving the gearbox 36.

A control 48 controls a drive 60 for moving the piston 54 along axis X toward and away from the radially outwardly extending surface 40. The details of how drive 60 may move piston 54 are within the skill of a worker in the art. Any number of arrangements may be utilized. A connection 62 is shown schematically. The control may be an appropriate electronic controller, and may be programmed to deliver a desired volume of air to the turbine blades 44. As an example, in the FIG. 2 position the valve piston 54 defines a fully open position within piston end 52 abutting stop surface 51. Alternatively a pneumatic, hydraulic or mechanical control could be used.

Air turbine starters often operate in a "bowed shaft" mode. If the gas turbine 20 is started before it is fully cooled off the shaft 22 may be somewhat distorted. Thus, the starting speed would be at a percentage of a full starting speed that would be achieved in the FIG. 2 position to allow the gas turbine to cool down.

Figure 3:
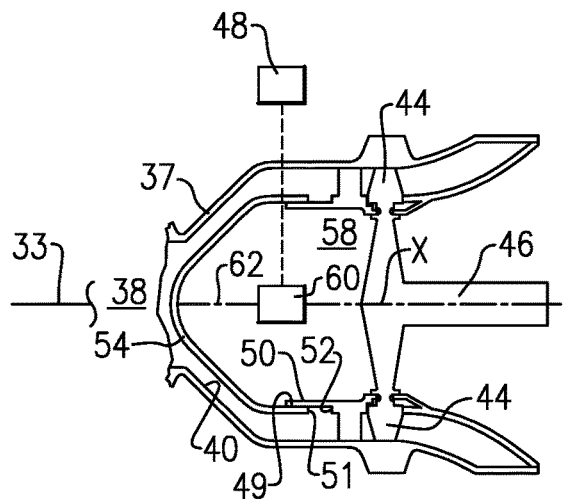
FIG. 3 shows the airflow control valve at an intermediate position.

This bowed start position is shown in FIG. 3. The surface 56 of the valve piston 54 has now been moved closer to the radially outwardly extending surface 40. The end 52 of the piston 54 is still guided on the surface 50. This position is achieved with the control 48 controlling drive 60 and its rotational axis 62 to move the valve piston 54 to the left along the axis X as shown in FIG. 3 from the FIG. 2 position.

Figure 4:
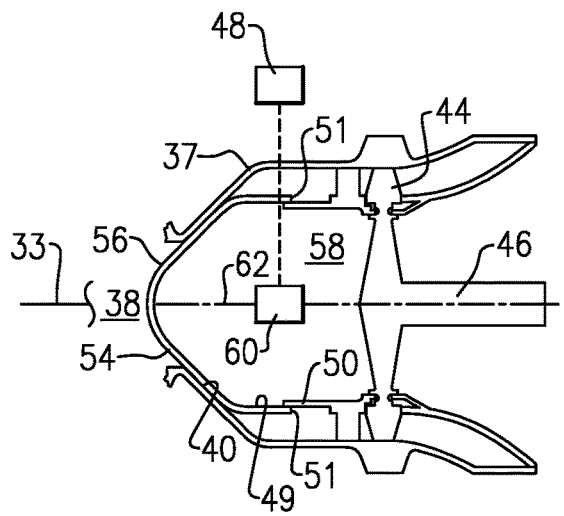
FIG. 4 shows the airflow control valve in a closed position.

FIG. 4 shows yet another position. In this position, the radially outwardly extending surface 56 of the valve piston 54 now abuts the radially outwardly extending surface 40 of the housing 37. In this position, no airflow is allowed to reach the turbine blades 44.

The mechanical member 60 is shown in a chamber 58 within piston 54 and spaced toward the inlet 38 relative to the turbine blades 44 and shaft 46.

By incorporating the valve into the nozzle, a separate required valve as found in the prior art is eliminated.

Moreover, the guiding surface between an interior 49 of piston 54 that is generally formed to be cylindrical and centered on the axis X, is closely guided along the surface 50 to achieve very precise positioning. Moreover, the overall packaging size is reduced given the incorporation of the valve.

A combined air turbine starter and flow control valve under this disclosure could be said to include a turbine having turbine blades and a shaft rotating with the turbine blades. The turbine is received within a nozzle housing. The nozzle housing includes an inlet. A radially outwardly extending inner surface extends from the inlet and toward the turbine blades. A flow control piston is received to be movable along a rotational axis of the turbine shaft, and toward and away the radially outwardly extending surface of the nozzle housing. A control is programmed to direct a movement system to position the flow control piston relative to the radially outwardly extending surface to achieve a desired volume of airflow to the turbine blades.

Although an embodiment has been disclosed, a worker of skill in this art would recognize that modifications would come within this scope of this disclosure. For that reason, the following claims should be studied to determine the true scope and content.

What is claimed is:

1. A combined air turbine starter and flow control valve comprising:
   a turbine having turbine blades and a shaft rotating with the turbine blades;
   the turbine received within a nozzle housing, the nozzle housing including an inlet, and a radially outwardly extending inner surface extending from the inlet and toward the turbine blades;
   a flow control piston received to be movable along a rotational axis of the turbine shaft, and toward and away from the radially outwardly extending surface of the nozzle housing;
   a control, programmed to direct a movement system to position the flow control piston relative to the radially outwardly extending surface to achieve a desired volume of airflow to the turbine blades;
   wherein the control controlling a mechanical movement structure; and
   wherein the control is programmed to move the flow control piston from a fully open position, to a bowed shaft position which allows air flow to reach the turbine blades, but at a reduced volume from the air flow reaching the turbine blade in the fully open position, and the control further being programmed to move the flow control piston to a fully closed position at which a radially outwardly extending surface of the flow control piston abuts the radially outwardly extending surface of the nozzle housing.

2. The combined system as set forth in claim 1, wherein the radially outwardly extending surface of the flow control piston extends into a generally cylindrical surface centered on the rotational axis.

3. The combined system as set forth in claim 2, wherein a static structure within the nozzle housing has a generally cylindrical guiding surface guiding the cylindrical surface of the flow control piston.

4. The combined system as set forth in claim 3, wherein the static structure has a stop surface, and the flow control piston has a downstream end which selectively abuts the stop surface when the flow control piston is in a fully open position.

5. The combined system as set forth in claim 1, wherein the radially outwardly extending surface of the flow control piston extends into a generally cylindrical surface centered on the rotational axis, wherein a static structure within the nozzle housing has a cylindrical guiding surface guiding the generally cylindrical surface of the flow control piston.

6. A combined air turbine starter and flow control valve comprising:
   a turbine having turbine blades and a shaft rotating with the turbine blades;
   the turbine received within a nozzle housing, the nozzle housing including an inlet, and a radially outwardly extending inner surface extending from the inlet and toward the turbine blades;
   a flow control piston received to be movable along a rotational axis of the turbine shaft, and toward and away from the radially outwardly extending surface of the nozzle housing;
   a control, programmed to direct a movement system to position the flow control piston relative to the radially outwardly extending surface to achieve a desired volume of airflow to the turbine blades;
   wherein a forward end of the flow control piston has a radially outwardly extending surface;
   wherein the radially outwardly extending surface of the flow control piston extends into a generally cylindrical surface centered on the rotational axis, wherein a static structure within the nozzle housing has a cylindrical guiding surface guiding the generally cylindrical surface of the flow control piston;
   wherein the static structure has a stop surface, and the flow control piston has a downstream end which selectively abuts the stop surface when the flow control piston is in a fully open position; and
   wherein the control is programmed to move the flow control piston from a fully open position, to a bowed shaft position which allows air flow to reach the turbine blades, but at a reduced volume from the air flow reaching the turbine blade in the fully open position, and the control further being programmed to move the flow control piston to a fully closed position at which the radially outwardly extending surface of the flow control piston abuts the radially outwardly extending surface of the nozzle housing.

7. The combined system as set forth in claim 6, wherein the control controls a mechanical movement structure.

8. The combined system as set forth in claim 6, wherein the control is programmed to move the flow control piston from a fully open position, to a bowed shaft position which allows air flow to reach the turbine blades, but at a reduced volume from the air flow reaching the turbine blade in the fully open position, and the control further being programmed to move the flow control piston to a fully closed position at which the radially outwardly extending surface of the flow control valve abuts the radially outwardly extending surface of the nozzle housing.

9. A gas turbine engine starting system comprising:
   a source of compressed air for selectively delivering air into a conduit, said conduit being connected to a combined air turbine starter and flow control valve;
   the combined air turbine system and flow control valve has a turbine with turbine blades and a shaft rotating with the turbine blades;
   the turbine received within a nozzle housing, the nozzle housing including an inlet, and a radially outwardly extending inner surface extending from the inlet and toward the turbine blades;

a flow control piston received to be movable along a rotational axis of the turbine shaft, and toward and away from the radially outwardly extending surface of the nozzle housing;

a control programmed to direct a movement system to position the flow control piston relative to the radially outwardly extending surface to achieve a desired volume of airflow to the turbine blades;

wherein the control is programmed to move the flow control piston from a fully open position, to a bowed shaft position which allows air flow to reach the turbine blades, but at a reduced volume from the air flow reaching the turbine blade in the fully open position, and the control further being programmed to move the flow control piston to a fully closed position at which a radially outwardly extending surface of the flow control piston abuts the radially outwardly extending surface of the nozzle housing; and wherein the control controls a mechanical movement structure.

10. The starting system as set forth in claim 9, wherein the radially outwardly extending surface of the flow control piston extending into a generally cylindrical surface centered on the rotational axis.

11. The starting system as set forth in claim 10, wherein a static structure within the nozzle housing has the generally cylindrical surface guiding the cylindrical surface of the flow control piston.

12. The starting system as set forth in claim 11, wherein the static structure has a stop surface, and the flow control piston has a downstream end which selectively abuts the stop surface when the flow control piston is in a fully open position.

13. The starting system as set forth in claim 9, wherein the radially outwardly extending surface of the flow control piston extends into a generally cylindrical surface centered on the rotational axis, wherein a static structure within the nozzle housing has a cylindrical guiding surface guiding the generally cylindrical surface.

14. The starting system as set forth in claim 13, wherein the static structure has a stop surface, and the flow control piston has a downstream end which selectively abuts the stop surface when the flow control piston is in a fully open position.

* * * * *